Figure 1:
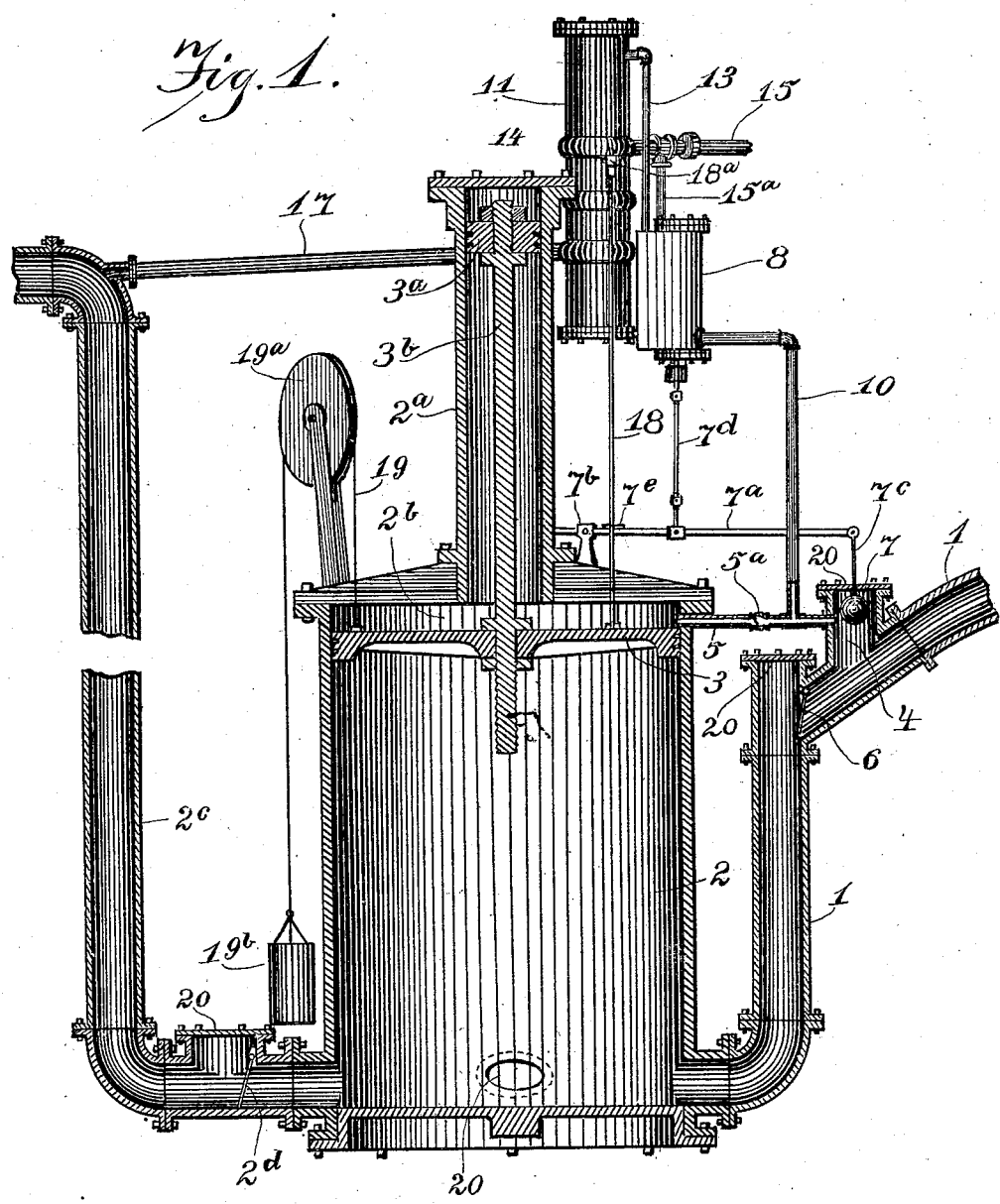

No. 842,286. PATENTED JAN. 29, 1907.
E. A. WILSON & C. RIGDON.
SEWAGE ELEVATING AND DISCHARGING APPARATUS.
APPLICATION FILED MAY 1, 1905.

2 SHEETS—SHEET 1.

WITNESSES:

INVENTORS
Eric A. Wilson
Charles Rigdon
BY James T. Watson
ATTORNEY.

THE NORRIS PETERS CO., WASHINGTON, D. C.

No. 842,286.  
PATENTED JAN. 29, 1907.  
E. A. WILSON & C. RIGDON.  
SEWAGE ELEVATING AND DISCHARGING APPARATUS.  
APPLICATION FILED MAY 1, 1905.
2 SHEETS—SHEET 2.
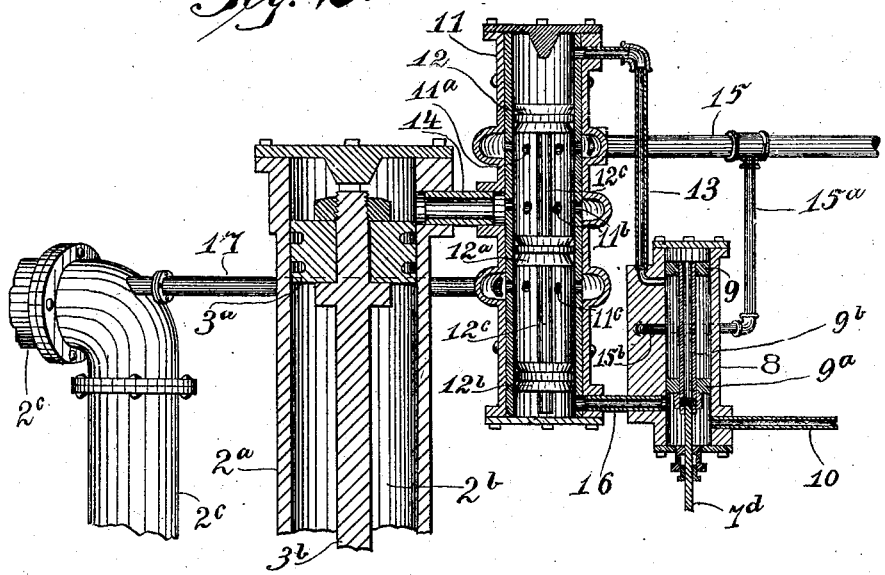
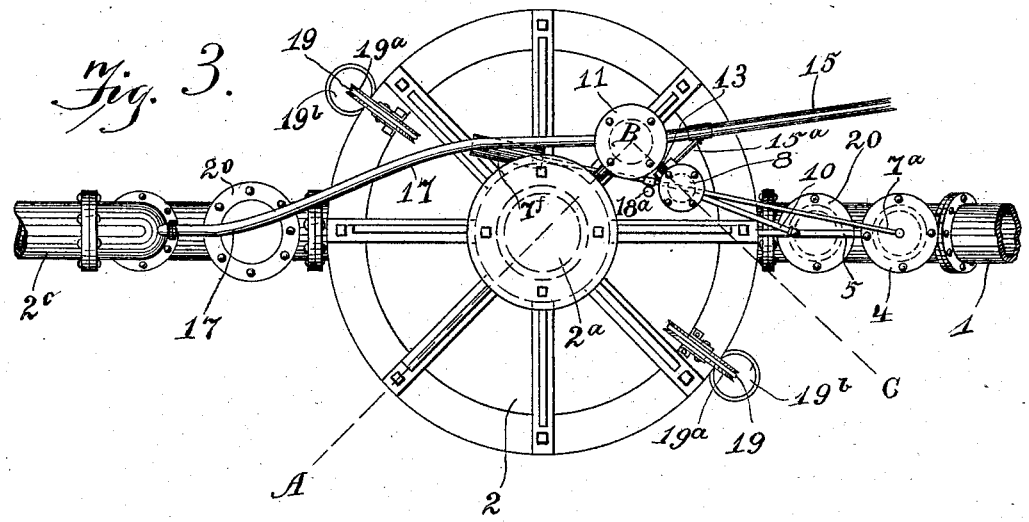
WITNESSES:
INVENTORS  
Eric A. Wilson  
Charles Rigdon  
BY James T. Watson  
ATTORNEY.

UNITED STATES PATENT OFFICE.

ERIC A. WILSON AND CHARLES RIGDON, OF DULUTH, MINNESOTA, ASSIGNORS OF ONE-FOURTH TO DANIEL D. MURRAY AND ONE-FOURTH TO THOMAS F. McGILVRAY, OF DULUTH, MINNESOTA.

SEWAGE ELEVATING AND DISCHARGING APPARATUS.

No. 842,286.     Specification of Letters Patent.     Patented Jan. 29, 1907.

Application filed May 1, 1905. Serial No. 258,412.

*To all whom it may concern:*

Be it known that we, ERIC A. WILSON and CHARLES RIGDON, citizens of the United States, residing at Duluth, in the county of St. Louis and State of Minnesota, have invented certain new and useful Improvements in Sewage Elevating and Discharging Apparatus; and we do hereby declare the following to be a full, clear, and exact description of the invention, such as will enable others skilled in the art to which it appertains to make and use the same.

Our invention relates to sewage elevating and discharging apparatus, and has for its object the provision of means whereby sewage may be elevated from low levels and discharged into conduits having sufficient elevation and inclination to carry it to the terminal of the system by gravity under conditions which will tend to prevent any serious backing up of sewage in the mains or waste-pipes by which it is collected.

It consists, in combination with a sewage-collecting main or conduit or conduits, of a tank or temporary reservoir, a piston for evactuating said tank, and means for automatically operating said piston, and of certain other constructions, combinations, and arrangements of parts, as will be hereinafter described and claimed.

In the accompanying drawings, to which reference is hereby made, Figure 1 is a central vertical section through said apparatus. Fig. 2 is an enlarged view of the upper part of said apparatus in vertical section on the line A B C of Fig. 3. Fig. 3 is an enlarged top plan view of said apparatus.

In the drawings, 1 is a sewage-collecting conduit leading from a higher elevation into the lower end of a tank or reservoir 2, which is preferably reduced in diameter at its opposite end, as at $2^a$. Within said tank is a double-headed or tandem piston having the heads 3 and $3^a$ connected to each other by the rod $3^b$. An annular chamber $2^b$ is thus formed between said heads. Communicating with said pipe 1 is a tide-chamber 4, which is connected with said chamber $2^b$ by a conduit 5, in which is placed a check-valve of any suitable construction, as $5^a$, adapted to permit flow from said chamber $2^b$ to said chamber 5, but to prevent return-flow through said conduit 5 from the chamber 4 to the chamber $2^b$. Between said chamber 4 and the lower end of said conduit 1 is a check-valve 6 of any suitable construction adapted to permit the flow of sewage through said conduit 1 into the lower end of said tank below said piston, but to prevent any return-flow thereof past said valve. Within said chamber 4 is a float 7, connected by a stem $7^c$ with a lever $7^a$, which is pivoted upon a suitable support and intermediate of its fulcrum and the point of its connection to the stem $7^c$ is connected with a valve-stem $7^d$, which is secured to the valve in the chamber 8. Within said valve-chamber 8 is a doubel-headed or tandem piston-valve having the heads 9 and $9^a$ connected to each other by the tubular rod $9^b$. Leading into the lower end of said casing 8 is a water waste pipe or drain 10. Intermediate of said tank 2 or the reduced portion $2^a$ thereof and said chamber 8 is a valve-chamber 11, in which is contained a three-headed tandem piston-valve having the heads 12, $12^a$, and $12^b$ connected by any suitable means, as by the rod or rods $12^c$, in such manner as to partition said chamber 11 into four parts. Said chamber 11 has ports communicating therewith, as $11^a$, $11^b$, and $11^c$, said ports $11^b$ being formed, preferably, at the center of said chamber and said ports $11^a$ and $11^c$ being formed above and below the same, respectively.

The ports $11^a$, $11^b$, and $11^c$ are so arranged that when the valve in said chamber 11 is down the ports $11^a$ and $11^b$ will communicate with that part of said chamber which is between said heads 12 and $12^a$, and at such time said port or ports $11^c$ will communicate with the chamber between the heads $12^a$ and $12^b$, and when said valve is raised the ports $11^b$ and $11^c$ will communicate with that part of said chamber which is then between the heads $12^a$ and $12^b$, and at such time the port or ports $11^a$ will communicate with that part of said chamber that is then between the said heads 12 and $12^a$. The upper end of said chamber 11 above the valve-head 12 communicates with the upper end of said chamber 8 by means of a pipe 13 in such manner that the mouth of said communication will when the valve in chamber 8 is raised be below the valve-head 9, and when the said valve is lowered the entry of said pipe 13 to the chamber 8 will be above said valve-head 9, during which latter period it may discharge into the pipe or drain 10 through the tubular rod $9^b$ and that part of the chamber 8 which is then below said valve-head $9^a$.

The upper end of the tank 2 or reduced portion $2^a$ thereof above the raised piston-head $3^a$ communicates with the port or ports $11^b$ through a pipe 14. A water-supply pipe 15, connected with any suitable source of supply (not shown)—as, for example, the water-supply reservoir or stand-pipe or a municipal water-supply system (not shown)—communicates with said port or ports $11^a$, and a branch $15^a$ of said pipe 15 communicates with a port $15^b$, entering said chamber 8 between said valve-heads 9 and $9^a$. The lower ends of said chamber 11 below the lowered position of said valve-head $12^b$ communicates by means of a pipe 16 with the lower end of said chamber 8 at a point where the opening into the chamber 8 will be below the raised position of the valve-head $9^a$, but will be above the valve-head $9^a$ when said valve is in its lowered position.

Extending outwardly and upwardly any suitable distance from the bottom of said tank 2 is a sewage-discharge pipe $2^c$, in which is preferably positioned a check-valve $2^d$, which check-valve is adapted to permit sewage to flow through said pipe from said tank, but to prevent the return-flow thereof to said tank through said pipe. A waste-pipe 17 forms a communication between said port or ports $11^c$ and any suitable place of discharge, as preferably into the upper end of said pipe $2^c$. Extending into said tank and attached to said piston-head 3 is a rod 18, projected through a collar or fork $7^e$ on said rod $7^a$ and provided at its upper end with a button $18^a$, adapted when said piston-head 3 descends to draw down said lever $7^a$ to reverse the valve in said chamber 8. Any suitable number or character of counterbalances are arranged to raise the piston in the tank—as, for example, wires 19 may be attached to said piston-head 3 and carried upward through the roof of the enlarged end of said tank, thence over guide-wheels or fulcrums $19^a$ and attached at their opposite ends to weights $19^b$, which they are adapted to suspend. Hand-holes or man-holes provided with suitable covers, as 20, may be provided at any suitable place or places to give access to tank or any of the various chambers for cleaning-out or repairing purposes.

In operation, the piston in the tank being in lowered position and the valve in the chamber 11 being raised and the valve in chamber 8 being lowered, the counterweights raise the piston in the tank, and the sewage flows down through the pipe 1 into the tank 2 below the piston-head 3, such water as has accumulated above the piston-head $3^a$ being forced out through the pipe 14 into the chamber 11 and thence through the pipes 17 and $2^c$ to a point of discharge.

The level of sewage will rise or back up in said pipe 1 to the height to which it rises in said tank until the tide of sewage rises into the tide-chamber 4 and floats the float 7, which is thereby raised sufficiently to raise the valve in the chamber 8 through the medium of the various intermediate rods and lever, as $7^c$, $7^a$, and $7^d$. The raising of the valve in the chamber 8 operates to bring the port $15^b$ and that part of chamber 8 then between the piston-heads 9 and $9^a$ and the port or pipe 13 into serial communication, whereupon the water under pressure will flow from the pipes 15 and $15^a$ through said serial communication to the upper end of the chamber 11 and depress the valve therein, which action will bring the ports $11^a$ and $11^b$ into communication, whereupon the water under pressure will flow from the pipe 15 into the chamber 11 between the valve-heads 12 and $12^a$, thence out through the port or ports $11^b$ into the pipe 14 and thence into the upper end of the tank 2, (or reduced portion $2^a$ thereof.) The piston in the tank will thereupon be forced down upon the stored sewage, forcing the greater part of it through the pipe $2^c$ to any suitable point of discharge. When said valve in the chamber 11 is forced downward, any accumulated water below the valve-head $12^b$ is forced out through the pipe 16 into the lower end of the chamber 8 and thence through the pipe 10 to any suitable place of discharge. The downward movement of the piston in said tank draws down the rod 18, and when said piston in the tank has nearly reached its lowest position the button $18^a$ engages the fork or collar $7^e$ and draws down the lever $7^a$ and the rod $7^d$, thereby reversing the valve in the chamber 8. The reversing of the last said valve will operate to cut the communication between said port $15^b$ and said pipe 13 and to cut the communication between said pipe 16 and said pipe 10 and to open communication between said port $15^b$ and said pipe 16. Water under pressure will thereupon flow through said branch $15^a$ and port $15^b$ and that part of the chamber 8 then between the valve-heads 9 and $9^a$ and through the pipe 16 to the chamber 11 below the valve-head $12^b$, thus raising the valve in the chamber 11. The valve-head $12^a$ will now cut the communication between said ports $11^a$ and $11^b$ and water will no longer flow into the tank above said piston-head $3^a$. While said valve in the chamber 11 is moving upward, any water above the valve-head 12 will be forced out of said chamber 11 through the pipe 13, thence into the upper end of the chamber 8, thence through the tubular rod $9^b$ to the lower end of said chamber 8, thence through the drain-pipe 10 to any suitable place of discharge.

If any sewage or water leaks past the piston-heads 3 or 3ª, it will find an outlet through the pipe 5 to said tidal chamber; but, if desired, the connection of the pipe 5 with said tank may be omitted. While we have shown a reduced portion 2ª of said tank, it is obvious that the portion 2ª may within the scope of our invention be of equal diameter with the sewage-chamber of said tank or may even be of greater diameter. The diameter of the portion 2ª will in practice be usually governed by the average available pressure of water per square inch of area which can be put upon the piston-head 3ª.

Said apparatus may also be modified in various details of construction, all within the scope and spirit of our said invention. We do not, therefore, desire to be limited to any particular or exact size or contour or proportion of said tank or other part or parts of said apparatus or to the exact construction of the valves shown where other styles or valves adapted to perform equivalent operations may be used.

Having now described our invention, what we claim, and desire to secure by Letters Patent, is—

1. The combination of a cylinder or tank, a conduit for a flowing power-supply discharging intermittently into one end of said tank, a conduit for a liquid or flowing substance to be acted upon, discharging intermittently into the opposite end of said tank, a piston in said tank positioned at all times between the points of discharge into said tank of said power-supply and of the liquid or flowing substance to be acted upon, valvular means adapted to govern the discharge of the power-supply into said tank and adapted to be operated by the said power-supply, secondary valvular means adapted to govern the power-supply to the first said valvular means, mechanical means for operating said secondary valvular means and adapted to be actuated by the said liquid or flowing substance to be acted upon, mechanical means including said piston for retracting said secondary valvular means and adapted to be actuated by said power-supply, an exhaust-conduit extending from the said opposite end of said tank upwardly and away from said tank, a check-valve adapted to prevent the return of matter ejected from said opposite end of said tank through said exhaust-conduit, a check-valve adapted to prevent the return of matter to its source after entering said opposite end of said tank, and an exhaust-conduit governed by the first said valvular means, adapted to convey away the exhaust of the said power-supply.

2. The combination of a power-tank divided into separate compartments by a piston, a conduit for a power-supply for operating said piston in one direction, a conduit for a liquid or flowing substance to be acted upon for operating said piston in the opposite direction, valvular means adapted to govern the action of said power-supply with respect to said piston and to be operated by the said power-supply, a second valvular means adapted to govern the action of the said power-supply with relation to the first said valvular means and to be operated by mechanical means actuated by the liquid or flowing substance to be acted upon.

3. The combination of a tank divided into compartments by piston means, a conduit connecting with one end of said tank for a water-power supply adapted to operate intermittently upon one end of said piston means, a conduit connecting with the other end of said tank, for a sewerage-supply to be acted upon adapted to operate intermittently upon the other end of said pistonal means, valvular means adapted to be operated by said water-power supply and to govern the water-power supply to said piston means, a secondary valvular means adapted to govern the water-power supply to the first said valvular means, a float adapted to be operated by said sewerage, means connecting said float with said secondary valvular means for transmitting power for operating said secondary valvular means, means adapted to retract said secondary valvular means before the completion of the movement of said piston means under the impulse of said water-power, means for conveying away the exhaust water-power from said tank and valvular means, and means for conveying away the exhaust-sewerage from said tank.

4. The combination of a tank, a piston dividing said tank into separate compartments a conduit adapted to discharge into one of said compartments a flowing power-supply for moving said piston in one direction, means for moving said piston in the opposite direction, a conduit adapted to discharge into the other of said compartments a flowing or mobile substance or liquid to be acted upon by said piston, means governing the flow of said power-supply to said tank and governing the flow of the exhaust therefrom, said means being actuated in part by said power-supply and in part by said substance or liquid to be acted upon, and a conduit for carrying away from said tank the substance or liquid acted upon by said piston.

In testimony whereof we hereunto affix our signatures in presence of two witnesses.

ERIC A. WILSON.
CHARLES RIGDON.

Witnesses:
H. H. LEMENTZ,
JAMES T. WATSON.